April 8, 1969 J. D. STITH 3,437,753

PAN AND TILT TELEVISION CAMERA

Filed Dec. 7, 1965

INVENTOR
JOE D. STITH

BY Robillard and Byrne

ATTORNEYS

United States Patent Office 3,437,753

Patented Apr. 8, 1969

3,437,753

PAN AND TILT TELEVISION CAMERA

Joe D. Stith, Muskogee, Okla., assignor to Coburn Manufacturing Company, Inc., Muskogee, Okla., a corporation of Oklahoma Filed Dec. 7, 1965, Ser. No. 512,058
Int. Cl. H01j 29/02; H04n 3/10; G03b 17/00
U.S. Cl. 178—7.81 2 Claims

ABSTRACT OF THE DISCLOSURE

This invention is directed to a remote control system for controlling the orientation of remotely positioned cameras. The system comprises a network of switches for actuating electric motors each of which are mounted on the camera support. One motor causes a horizontal scanning movement of the camera through a gear arrangement; another motor causes a vertical scanning movement of the camera through a crank and pitman arrangement.

This invention relates generally to camera systems and more particularly to a novel supporting device for cameras which provides for remote control of the orientation thereof.

This invention is specifically adapted for, but not limited to, use with a network of remote television surveillance or monitoring cameras. The use of systems of this type is increasingly widespread in military and industrial installation security, production monitoring and like uses. Prior art systems, in general, utilized fixed camera installations thereby limiting the capability of the systems by reducing the scope of view available at individual camera stations.

It is an object of this invention to provide a remote visual monitoring system with a monitoring scope which is greatly increased over prior art systems by furnishing means to remotely orient each of the cameras of the system.

It is another object of this invention to provide a novel support for remotely controlled cameras which furnishes full tilt and pan capability for the camera by employing simple mechanical linkages and a minimum of moving parts.

It is a further object of this invention to furnish a pan and tilt mechanism for remotely controlled cameras which is efficient, compact and easily fabricated by providing a rotatably mounted camera support with support-mounted power units for accomplishing the pan and tilt.

These and other objects of the invention will become more readily understood to those skilled in the art by reference to the following detailed description wherein like parts are indicated by like numerals throughout the figures thereof and wherein.

Figures 1, 2:
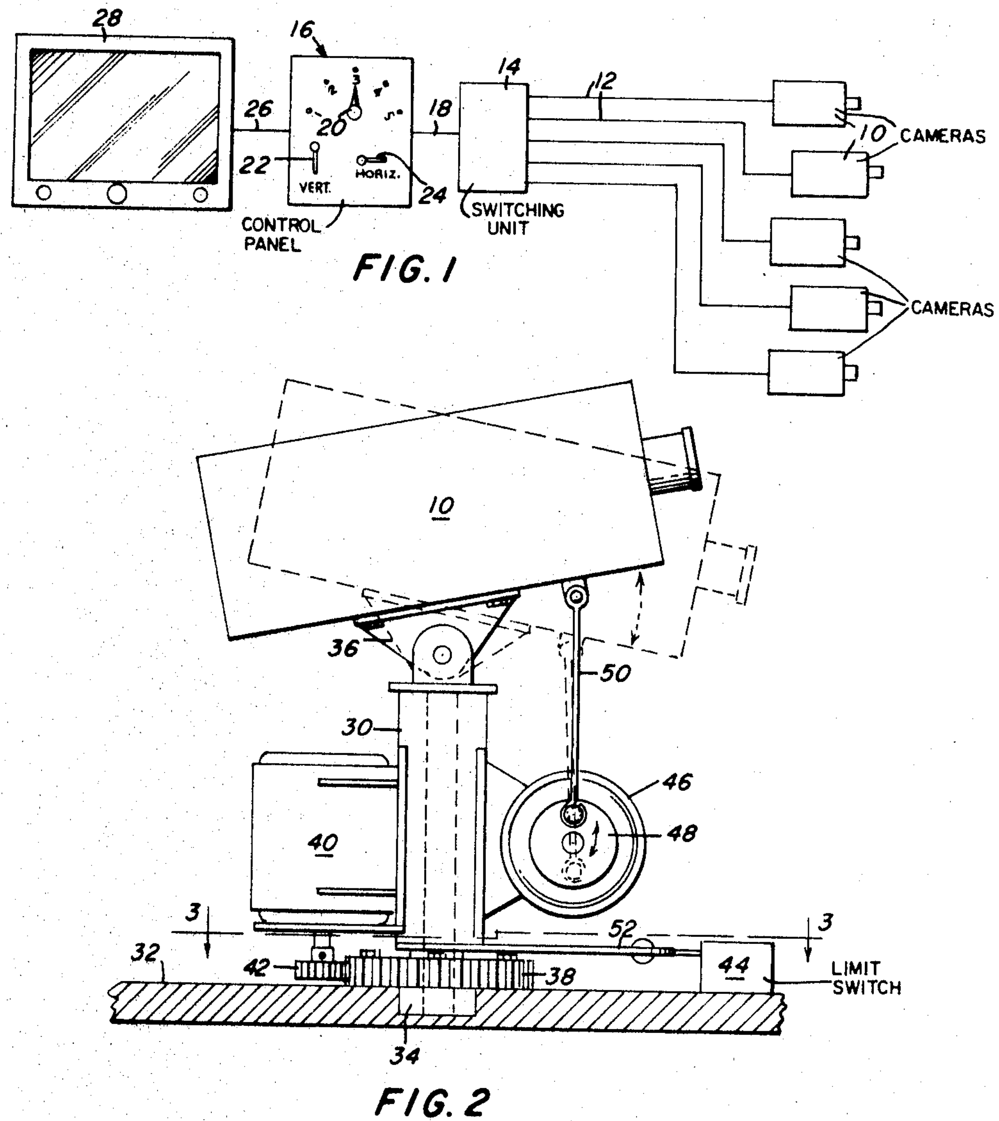
FIGURE 1 is a schematic view of a remotely controlled monitoring system in accordance with the invention.
FIGURE 2 is a side elevational view partly in section of a monitoring camera and mount of the system of FIGURE 1.

Turning now to FIGURE 1 of the drawings, a system incorporating the precepts of this invention as specifically applied to a closed circuit television monitoring application, is shown schematically. A series of television cameras 10, suitably placed at locations throughout a plant where monitoring is desired, are connected by individual control and transmission lines 12 to a remote switching unit 14. The remote switching unit 14 is, in turn, connected to a control panel 16 by a transmission and control line 18. The control panel 16 includes a master camera selector switch 20 which, through the transmission and control line 18 operates a slave switch in the remote switching unit 14 to select the camera for which transmission and control is to be accomplished at any particular time. Vertical and horizontal camera attitude control switches 22 and 24 respectively are included in the control panel 16 to provide for panning or tilting of a selected camera as desired. The operation of the pan and tilt mechanism will be described in greater detail below. A transmission line 26 connects the selected camera to a television monitoring set 28.

With reference now to FIGURE 2, the mounting and actuating structure of each of the cameras 10 is shown in enlarged detail. An upright member 30 is mounted for rotation about its longitudinal axis on a stationary platform 32 through a bearing 34 affixed in the platform. A camera supporting base 36 is mounted for pivoting about a horizontal axis on the upper end of the upright 30 and supports the camera 10 thereon.

The camera orientation structure comprises means to rotate the upright 30 around its vertical axis and means to tilt the supporting base 36 about its pivotal horizontal axis. The first mentioned means comprises a stationary spur gear 38 mounted on the platform 32 and a vertically disposed motor 40 mounted on the upright 30. A driving gear 42 is mounted on the drive shaft of the motor 40 in meshed engagement with the stationary gear 38. The motor 40 is suitably connected to the remote switching unit 14 (FIGURE 1), through the transmission and control line 12 corresponding to the camera on which it is mounted, for energization thereof by suitable actuation of the switch 24. Means are also provided for reversal of the drive direction of the motor 40 by suitable actuation of the switch 24 to the right or to the left as desired. The switch 24 is preferably of the double pole type and is spring loaded to a neutral position so that deflection of the switch to either the right or to the left will energize the motor in the appropriate direction. A pair of limit switches 44 are disposed in the electrical power circuit to the motor 40 and serve to break the circuit thereto when the upright 30 has been rotated to a certain degree as will be described in more detail below.

The tilting means comprise a horizontally disposed motor 46 mounted on the upright 30 and connected to the camera 10 at a point spaced from the pivotal connection of the mount 36 to the upright 30. This connection comprises a pitman arrangement including a crank 48 mounted on the drive shaft of the motor 46 and a pitman arm 50 pivotally connecting the camera 10 and to the crank 48. The motor 46 is also connected to the remote switching unit 14 (FIGURE 1), through the transmission and control line 12 corresponding to the camera selected, for energization thereof by the switch 22 on the control panel 16. The motor 46 is also of the reversible type and the controlling switch 22 is preferably a two pole spring loaded switch, identical to switch 24, controlling the direction of rotation of the motor 46 in the same manner as described for that switch.

Figure 3:
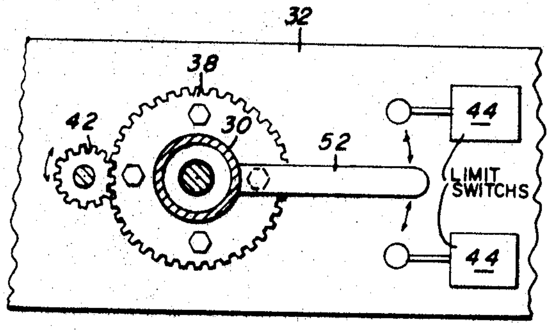
FIGURE 3 in a sectional view of a portion of the device of FIGURE 2 taken along the lines 3—3 thereof.

In FIGURE 3, the disposition of the limit switches 44 is shown in clearer detail. A switch actuating arm 52, mounted for rotation with the support 30 extends between the trip arms of the switches 44 and, as the member 30 is rotated to one extreme or the other, actuates the proper switch to interrupt rotation of the mount at that limit. The electrical circuitry is preferably arranged so that the motor may be reversed, on interruption of the circuit powering rotation in one direction, by any of the devices or circuits known to those skilled in the art.

It should be obvious that the particular linkages for providing the pan and tilt motions may be varied if so desired within the intended scope of the invention. For example, the crank-pitman arm arrangement of the tilting means could be substituted for the spur gear drive of the panning means and, by proper design, eliminate the need for limit switches 44.

The utilization of the remote switching unit 14 reduces the number of separate lines required in the transmission and control line 18 thereby reducing the complexity and cost of the equipment.

In operation, the system is energized by a suitable power switch (not shown) and each camera of the system is selected by proper positioning of the selector switch 20. By so positioning the switch, the image from the selected camera is transmitted to the monitoring set 28 and the drive motors of that camera are connected to the control switches 22 and 24 through the slave switch in the remote switching unit 14. If a further field of view is desired at any of the monitored stations, the vertical and horizontal control switches 22 and 24 are suitably displaced to energize the required motor and reorient the camera as is desired. For example, in FIGURE 2, if it is desired to tilt the camera through its full vertical span, the switch 22 could be displaced upwardly and held in that position while the motor drives the base 36 to its full upward position. Because of the crank and pitman connection, a continued energization of the motor 46 in the same direction will cause the base 36 to recycle and tilt ultimately to its lowest position and so on. If, at any point, it is desired to reverse the tilt, the switch 22 may be depressed for reversal of the motor 46.

In a similar fashion, the camera may be simultaneously or separately panned by suitable energization of the motor 40 by right or left displacement of the switch 24. At the limits, as determined by the disposition of the limit switches 44, the motor 40 is reversed by reverse displacement of the switch 24 for return of the camera towards the center.

What has been set forth above is intended to be exemplary to enable those skilled in the art in the practice of the invention. It should therefore be understood that, within the scope of the appended claims, the invention may be practiced other than as specifically described.

What is new and therefore desired to be protected by Letters Patent of the United States is:

1. An apparatus for remotely positioning a camera unit comprising a stationary platform, a rotatable upright mounted on said platform for rotation about a vertical axis, a tiltable supporting base mounted on said upright for tilting about a horizontal axis, a camera mounted to said base, a first electric motor vertically mounted on said upright, a drive gear mounted on the drive shaft of said first motor, a spur gear fixed to said platform in concentric relationship to said upright and meshing with said drive gear for rotating said upright, a second electric motor horizontally mounted on said upright, a crank means mounted on the drive shaft of said second motor, a connecting rod pivotally connecting said crank and said camera at a point spaced from the axis of tilt of said base for tilting said supporting base, means to remotely control actuation of said first and second electric motors and limit switches mounted on said platform to restrict the action and rotation of said upright between angularly spaced limits.

2. The apparatus for remotely positioning a camera unit of claim 1 wherein a plurality of camera units are provided and said means to remotely control actuation of said motors includes switch means for selecting a single camera unit to be positioned.

References Cited

UNITED STATES PATENTS

| | | | |
|---|---|---|---|
| 2,822,720 | 2/1958 | Douglas | 88—16 |
| 2,962,547 | 11/1960 | Douglas | 178—7.81 X |
| 3,057,953 | 10/1962 | Guerth | 178—6.8 |
| 3,239,601 | 3/1966 | Keys | 178—6 |
| 3,257,505 | 6/1966 | Van Wechel | 178—6.8 |
| 3,261,912 | 7/1966 | Hemstreet | 178—6.8 |

ROBERT L. GRIFFIN, *Primary Examiner.*

R. K. ECKERT, Jr., *Assistant Examiner.*

U.S. Cl. X.R.

95—15, 86; 352—248